United States Patent
Hahn et al.

(10) Patent No.: US 12,446,024 B2
(45) Date of Patent: Oct. 14, 2025

(54) METHOD AND APPARATUS FOR TRANSMITTING AND RECEIVING HARQ RESPONSES IN WIRELESS COMMUNICATION SYSTEM SUPPORTING SIDELINK COMMUNICATION

(71) Applicants: Hyundai Motor Company, Seoul (KR); Kia Corporation, Seoul (KR)

(72) Inventors: Gene Back Hahn, Gyeonggi-do (KR); Hyuk Min Son, Jeollabuk-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 591 days.

(21) Appl. No.: 17/635,282

(22) PCT Filed: Jul. 22, 2020

(86) PCT No.: PCT/KR2020/009664
§ 371 (c)(1),
(2) Date: Feb. 14, 2022

(87) PCT Pub. No.: WO2021/029557
PCT Pub. Date: Feb. 18, 2021

(65) Prior Publication Data
US 2022/0295517 A1 Sep. 15, 2022

Related U.S. Application Data

(60) Provisional application No. 62/886,634, filed on Aug. 14, 2019.

(51) Int. Cl.
*H04W 72/1263* (2023.01)
*H04L 1/1812* (2023.01)
(Continued)

(52) U.S. Cl.
CPC ....... *H04W 72/1263* (2013.01); *H04L 1/1812* (2013.01); *H04L 5/0053* (2013.01);
(Continued)

(58) Field of Classification Search
CPC ......... H04W 72/1263; H04W 72/0446; H04W 72/0453; H04W 72/20; H04W 4/40;
(Continued)

(56) References Cited

U.S. PATENT DOCUMENTS

2017/0215183 A1 7/2017 Gulati et al.
2019/0182643 A1 6/2019 Kim et al.
(Continued)

FOREIGN PATENT DOCUMENTS

CN 109792594 A 5/2019
EP 3905569 A1 11/2021
(Continued)

OTHER PUBLICATIONS

Nokia, "Discussion on Sidelink Groupcast HARQ", R1-1905340, 3GPP TSG RAN WG1 Meeting #96bis, Xi', China, Apr. 3, 2019.
(Continued)

*Primary Examiner* — Liem H. Nguyen
(74) *Attorney, Agent, or Firm* — Fox Rothschild LLP

(57) ABSTRACT

Disclosed are a method and an apparatus for transmitting and receiving HARQ responses in a communication system supporting sidelink communication. The method of operating a transmitting terminal comprises the steps of: receiving,
(Continued)

from a base station, a higher layer signaling message including PSFCH configuration information; transmitting, to a plurality of receiving terminals, SCI including resource allocation information of data and configuration information for HARQ feedback for the data; transmitting the data to the plurality of receiving terminals in a PSSCH indicated by the SCI; and performing a monitoring operation to receive, from the plurality of receiving terminals, sequences mapped to HARQ responses for the data in a PSFCH resource region indicated by the PSFCH configuration information. Therefore, the performance of a communication system can be improved.

16 Claims, 9 Drawing Sheets

(51) Int. Cl.
   *H04L 5/00* (2006.01)
   *H04W 72/0446* (2023.01)
   *H04W 72/0453* (2023.01)
   *H04W 72/20* (2023.01)

(52) U.S. Cl.
   CPC ... *H04W 72/0446* (2013.01); *H04W 72/0453* (2013.01); *H04W 72/20* (2023.01)

(58) Field of Classification Search
   CPC .... H04W 92/18; H04L 1/1812; H04L 5/0053; H04L 2001/0097; H04L 1/1893; H04L 1/1896; H04L 5/0055; H04L 5/0094; H04L 5/0044; H04L 1/1861; H04L 1/1864
   See application file for complete search history.

(56) References Cited

U.S. PATENT DOCUMENTS

| | | | | |
|---|---|---|---|---|
| 2020/0015255 | A1* | 1/2020 | Khoryaev | H04W 72/21 |
| 2020/0053743 | A1* | 2/2020 | Cheng | H04W 4/40 |
| 2020/0228247 | A1* | 7/2020 | Guo | H04L 1/0025 |
| 2020/0296701 | A1* | 9/2020 | Park | H04L 1/1896 |
| 2020/0313743 | A1* | 10/2020 | Park | H04L 5/0048 |
| 2020/0351033 | A1* | 11/2020 | Ryu | H04L 1/1861 |
| 2021/0028891 | A1* | 1/2021 | Zhou | H04W 4/40 |
| 2021/0037468 | A1* | 2/2021 | Huang | H04W 72/044 |
| 2021/0321380 | A1 | 10/2021 | Zhao | |
| 2021/0336728 | A1* | 10/2021 | Selvanesan | H04L 1/1607 |
| 2022/0224451 | A1* | 7/2022 | Tang | H04W 72/0453 |
| 2022/0256535 | A1* | 8/2022 | Horiuchi | H04W 72/0446 |

FOREIGN PATENT DOCUMENTS

| | | |
|---|---|---|
| WO | 2018/084673 A1 | 5/2018 |
| WO | 2019-012041 A1 | 1/2019 |

OTHER PUBLICATIONS

Huawei, Sidelink Physical Layer Procedures for NR V2X, R1-1906008, 3GPP TSG WG1 Meeting #97, Reno, USA, May 3, 2019.
Mediatek Inc., "Discussion on V2X Physical Layer Procedure", R1-1906558, 3GPP TSG RAN WG1 Meeting #97, Reno, USA, May 4, 2019.
Huawei, "Sidelink Physical Layer Structure for NR V2X", R1-1906007, 3GPP TSG RAN WG1 Meeting #97, Reno, USA, May 3, 2019.
R1-1900197, "Discussion on physical layer procedure", 3GPP TSG RAN WG1 Ad-Hoc Meeting 1901, Taipei, Jan. 21-25, 2019, 9 pages.

* cited by examiner

METHOD AND APPARATUS FOR TRANSMITTING AND RECEIVING HARQ RESPONSES IN WIRELESS COMMUNICATION SYSTEM SUPPORTING SIDELINK COMMUNICATION

CROSS-REFERENCE TO RELATED APPLICATIONS

This application is a National Phase application filed under 35 USC 371 of PCT International Application No. PCT/KR2020/009664 with an International Filing Date of Jul. 22, 2020, which claims priority from U.S. Provisional Application No. 62/886,634, filed Aug. 14, 2019. The entire contents of these applications are incorporated herein by reference in their entirety.

BACKGROUND

(a) Technical Field

The present disclosure relates to a sidelink communication technique, more particularly, to a technique for transmitting and receiving hybrid automatic repeat request (HARQ) responses for sidelink communication performed in a groupcast scheme.

(b) Description of the Related Art

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, sidelink communication may be performed based on a unicast scheme, a multicast scheme, a groupcast scheme, and/or a broadcast scheme. In addition, a blind retransmission scheme may be supported for retransmission of sidelink data in sidelink communication, and a hybrid automatic repeat request (HARQ) operation may be supported. As a HARQ response (e.g., HARQ feedback) for sidelink data, acknowledgment (ACK) or negative ACK (NACK) may be transmitted.

In sidelink-groupcast communication, a plurality of receiving terminals may transmit HARQ responses to a transmitting terminal using the same radio resource. In this case, the transmitting terminal may not be able to identify the HARQ response of each receiving terminal. In this reason, methods for solving such the problem are required. Here, the sidelink-groupcast communication may be sidelink communication performed in a groupcast scheme. The transmitting terminal may be a terminal transmitting sidelink data, and the receiving terminal may be a terminal receiving the sidelink data.

SUMMARY

An objective of the present disclosure for solving the above-described problem is to provide a method and an apparatus for transmitting and receiving hybrid automatic repeat request (HARQ) responses in a communication system supporting sidelink communication.

An operation method of a transmitting terminal, according to a first exemplary embodiment of the present disclosure for achieving the objective, may comprise: receiving, from a base station, a higher layer signaling message including physical sidelink feedback channel (PSFCH) configuration information; transmitting, to a plurality of receiving terminals, sidelink control information (SCI) including resource allocation information of data and configuration information for hybrid automatic repeat request (HARQ) feedback for the data; transmitting, to the plurality of receiving terminals, the data on a physical sidelink shared channel (PSSCH) indicated by the SCI; and performing a monitoring operation to receive, from the plurality of receiving terminals, sequences mapped to HARQ responses for the data in a PSFCH resource region indicated by the PSFCH configuration information.

The higher layer signaling message may include information indicating a HARQ feedback scheme, the HARQ feedback scheme may be an acknowledgement (ACK)/negative ACK (NACK) feedback scheme or a NACK-only feedback scheme, ACK or NACK may be fed back when the ACK/NACK feedback scheme is used, and only NACK may be fed back when the NACK-only feedback scheme is used.

The higher layer signaling message may further include at least one of information indicating a maximum number of sequences usable in the PSFCH resource region, information indicating a sequence pattern, or a combination thereof, and the sequence pattern indicates a mapping relationship between the HARQ responses and the sequences.

The configuration information for HARQ feedback may include at least one of information indicating a HARQ feedback scheme, information indicating a feedback resource region allocated to the plurality of receiving terminals within the PSFCH resource region, information indicating the sequences allocated to the plurality of receiving terminals, or combinations thereof.

The PSFCH resource region may include a plurality of feedback resource regions, and the plurality of feedback resource regions may be allocated to different receiving terminals, respectively.

ACKs of the plurality of receiving terminals may be mapped to different sequences, and NACKs of the plurality of receiving terminals may be mapped to different sequences.

ACKs of the plurality of receiving terminals may be mapped to different sequences, and NACKs of the plurality of receiving terminals may be mapped to one sequence.

Sequences mapped to ACKs of the plurality of receiving terminals may not exist, and NACKs of the plurality of receiving terminals may be mapped to different sequences.

An operation method of a first receiving terminal, according to a second exemplary embodiment of the present disclosure for achieving the objective, may comprise: receiving, from a base station, a higher layer signaling message including physical sidelink feedback channel (PSFCH) configuration information; receiving, from a transmitting terminal, sidelink control information (SCI) including resource allocation information of data and configuration information for hybrid automatic repeat request (HARQ) feedback for the data; performing a monitoring operation on a physical sidelink shared channel (PSSCH) indicated by the SCI to receive the data from the transmitting terminal; and transmitting, to the transmitting terminal, a first sequence mapped to a HARQ response for the data through a PSFCH resource region indicated by the PSFCH configuration information, wherein the first sequence is orthogonal to a second sequence transmitted from a second receiving terminal in the PSFCH resource region.

The higher layer signaling message may include information indicating a HARQ feedback scheme, the HARQ feedback scheme may be an acknowledgement (ACK)/negative ACK (NACK) feedback scheme or a NACK-only feedback scheme, ACK or NACK may be transmitted when the ACK/NACK feedback scheme is used, and only NACK may be transmitted when the NACK-only feedback scheme is used.

The higher layer signaling message may further include at least one of information indicating a maximum number of sequences usable in the PSFCH resource region, information indicating a sequence pattern, or a combination thereof, and the sequence pattern may indicate a mapping relationship between the HARQ responses and the sequences.

The configuration information for HARQ feedback may include at least one of information indicating a HARQ feedback scheme, information indicating a feedback resource region allocated to the first receiving terminal within the PSFCH resource region, information indicating the first sequence allocated to the first receiving terminal, or combinations thereof.

ACKs of a plurality of receiving terminals including the first receiving terminal and the second receiving terminal may be mapped to different sequences, NACKs of the plurality of receiving terminals may be mapped to different sequences, and the sequences mapped to the ACKs may be orthogonal to the sequences mapped to the NACKs.

ACKs of a plurality of receiving terminals including the first receiving terminal and the second receiving terminal may be mapped to different sequences, NACKs of the plurality of receiving terminals may be mapped to one sequence, and the sequences mapped to the ACKs may be orthogonal to the one sequence mapped to the NACKs.

Sequences mapped to ACKs of a plurality of receiving terminals including the first receiving terminal and the second receiving terminal may not exist, and NACKs of the plurality of receiving terminals may be mapped to different sequences.

An operation method of a base station, according to a second exemplary embodiment of the present disclosure for achieving the objective, may comprise: configuring a physical sidelink feedback channel (PSFCH) resource region used for transmission and reception of hybrid automatic repeat request (HARQ) responses for data; configuring a sequence pattern indicating a mapping relationship between the HARQ responses and sequences; and transmitting a higher layer signaling message including configuration information of the PSFCH resource region and configuration information of the sequence pattern, wherein the sequences mapped to the HARQ responses are transmitted according to the sequence pattern in the PSFCH resource region.

The higher layer signaling message may include information indicating a HARQ feedback scheme, the HARQ feedback scheme may be an acknowledgement (ACK)/negative ACK (HACK) feedback scheme or a NACK-only feedback scheme, ACK or NACK may be transmitted when the ACK/NACK feedback scheme is used, and only NACK may be transmitted when the NACK-only feedback scheme is used.

The PSFCH resource region may include a plurality of feedback resource regions, and the plurality of feedback resource regions may be used for different terminals, respectively.

The sequence pattern may indicate that ACKs of a plurality of receiving terminals are mapped to different sequences, and NACKs of the plurality of receiving terminals are mapped to different sequences, and the sequences mapped to the ACKs may be orthogonal to the sequences mapped to the NACKs.

The sequence pattern may indicate that ACKs of a plurality of receiving terminals are mapped to different sequences, and NACKs of the plurality of receiving terminals are mapped to one sequence, and the sequences mapped to the ACKs may be orthogonal to the one sequence mapped to the NACKs.

According to the present disclosure, sequences (e.g., orthogonal sequences) mapped to HARQ responses may be configured. Receiving terminals may transmit sequences corresponding to HARQ responses for received data to a transmitting terminal (i.e., terminal having transmitted the data) using the same physical resource. The transmitting terminal may detect the sequences by performing a monitoring operation on the same physical resource. Since the sequences are orthogonal to each other, the transmitting terminal may distinguish the HARQ responses (e.g., ACK or NACK) of the respective receiving terminals by using the detected sequences. Accordingly, the sidelink communication can be efficiently performed, and the performance of the communication system can be improved.

DETAILED DESCRIPTION

Figure 1:
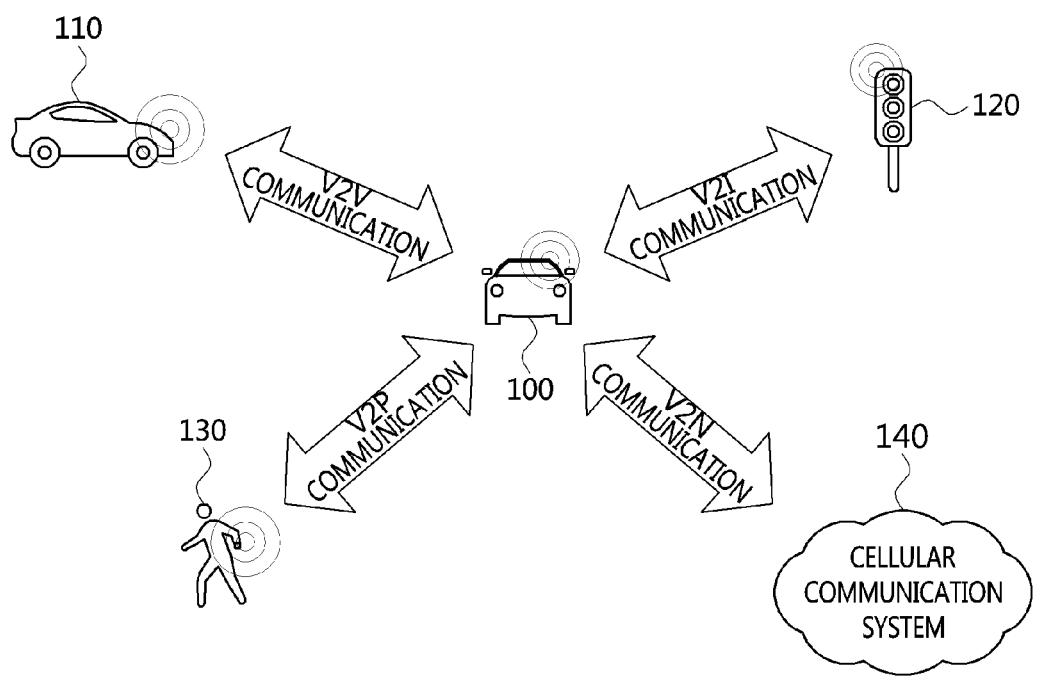
FIG. 1 is a conceptual diagram illustrating V2X communication scenarios.

While the present disclosure is susceptible to various modifications and alternative forms, specific embodiments are shown by way of example in the drawings and described in detail. It should be understood, however, that the description is not intended to limit the present disclosure to the specific embodiments, but, on the contrary, the present disclosure is to cover all modifications, equivalents, and alternatives that fall within the spirit and scope of the present disclosure.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present disclosure. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present disclosure pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present disclosure will be described in detail with reference to the accompanying drawings. In describing the present disclosure, to facilitate the entire understanding, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
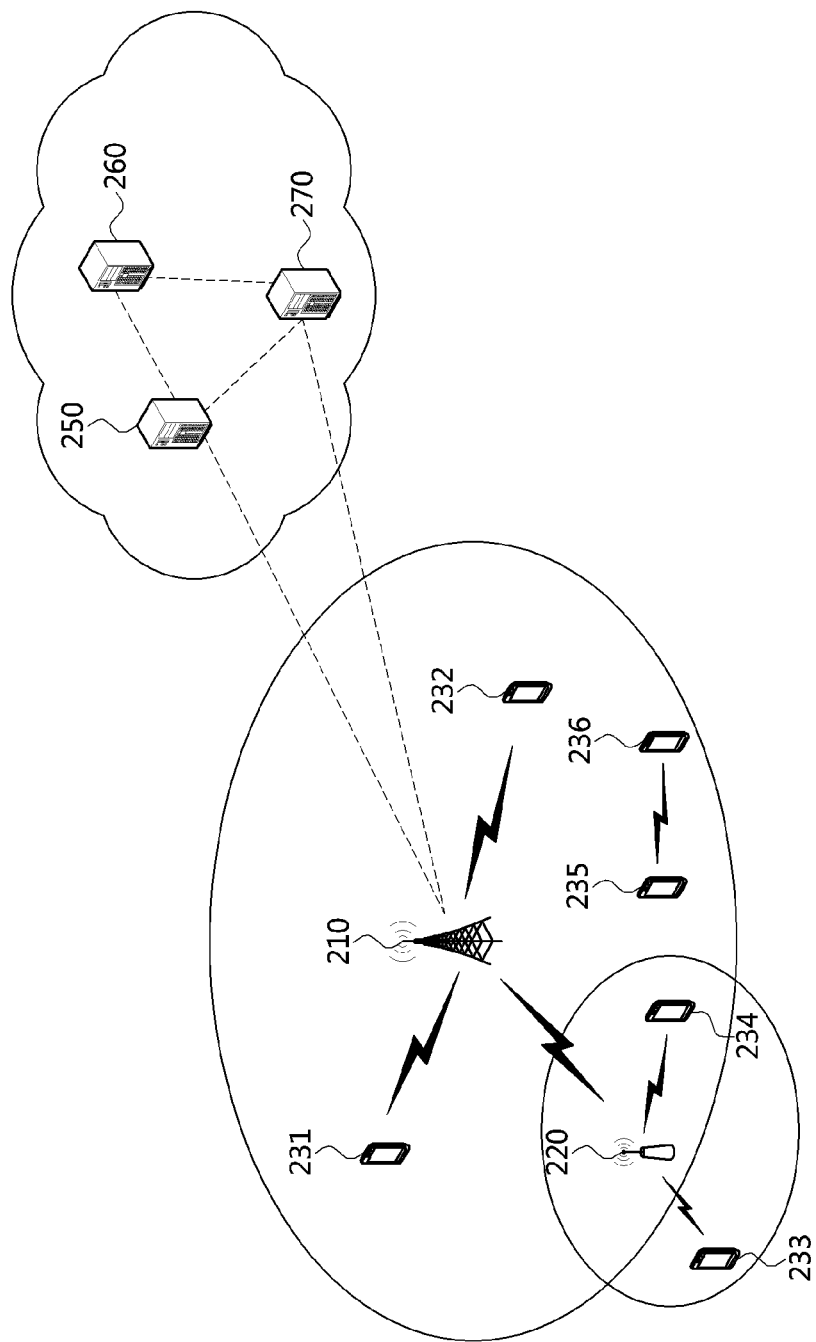
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
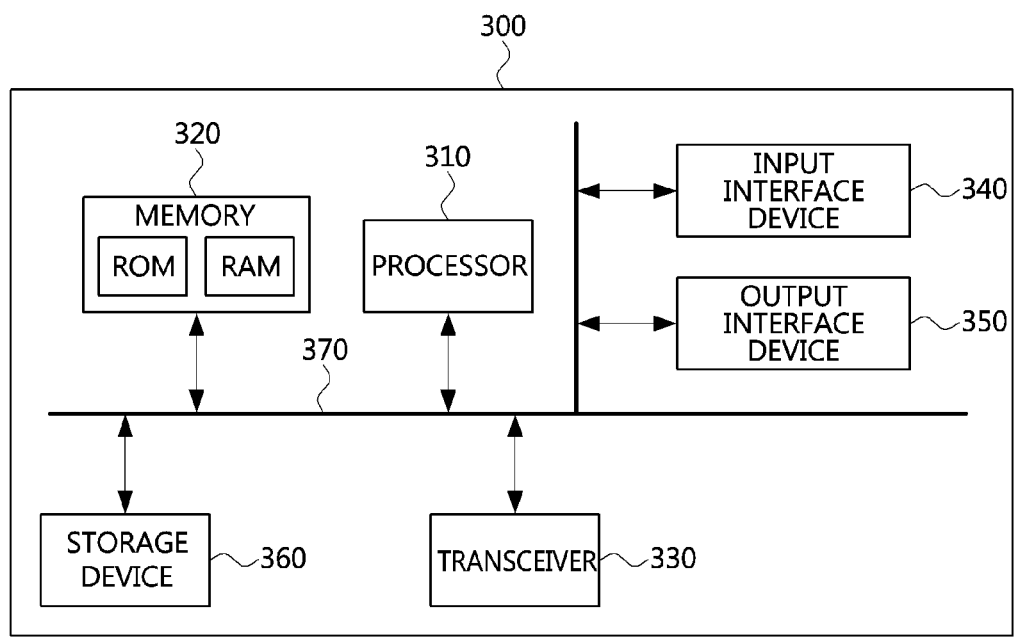
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
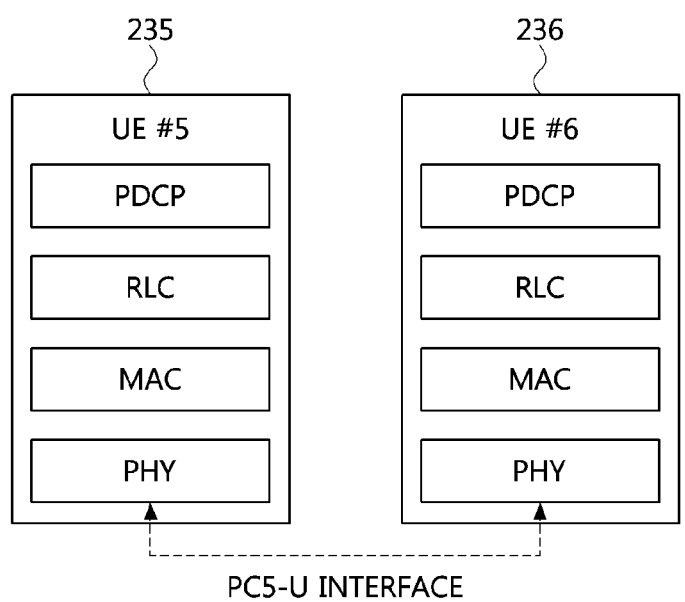
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
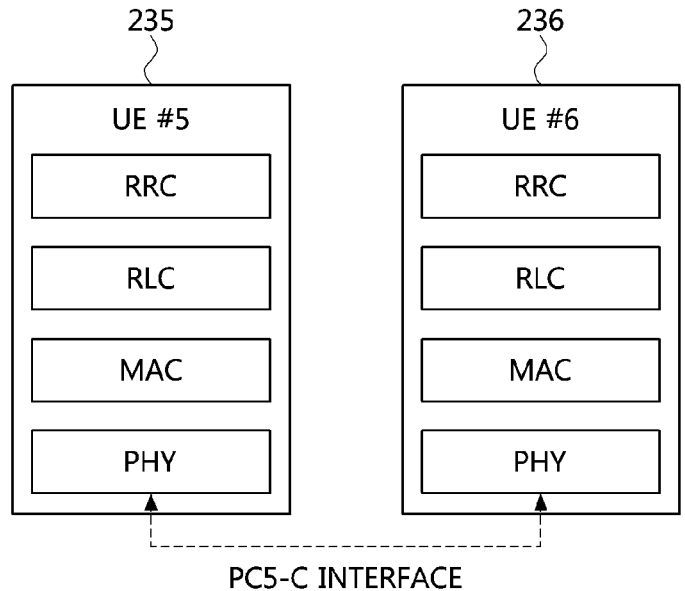
FIG. 5 is a block diagram illustrating a first exemplary embodiment of a control plane protocol stack of a UE performing sidelink communication.
Figure 6:
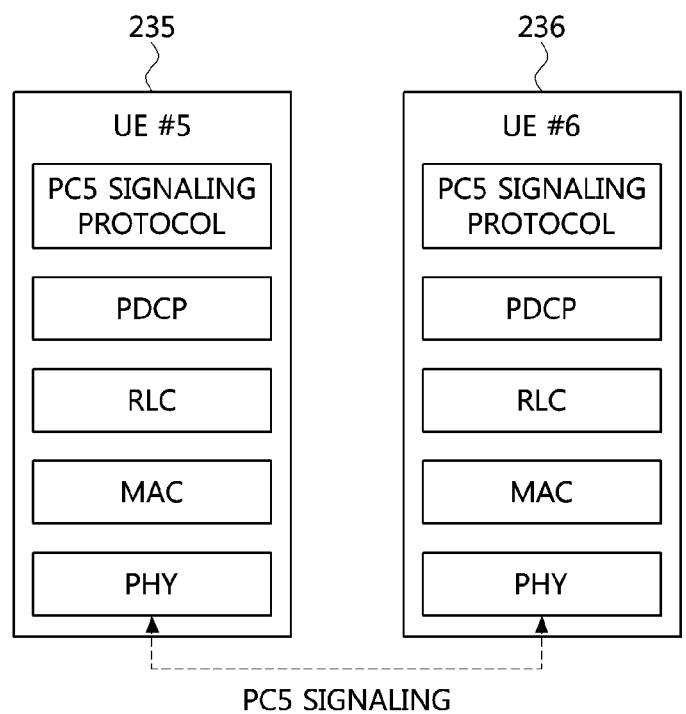
FIG. 6 is a block diagram illustrating a second exemplary embodiment of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, methods for transmitting and receiving HARQ responses in sidelink communication will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, a HARQ response may indicate acknowledgment (ACK), negative ACK (NACK), and/or discontinuous transmission (DTX). The exemplary embodiment applied to the case where a HARQ response indicates ACK may also be applied to the case where a HARQ response indicates NACK or DTX. The exemplary embodiment applied to the case where a HARQ response indicates NACK may also be applied to the case where a HARQ response indicates ACK or DTX. The exemplary embodiment applied to the case where a HARQ response indicates DTX may also be applied to the case where a HARQ response indicates ACK or NACK.

In exemplary embodiments, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

In sidelink communication (e.g., sidelink communication for V2X communication), a HARQ feedback operation may be supported. A HARQ feedback operation for sidelink-groupcast communication may be performed in two schemes. The sidelink-groupcast communication may mean sidelink communication performed in a groupcast scheme. In the first scheme, all receiving terminals participating in sidelink-groupcast communication (e.g., terminals receiving sidelink data) may share a PSFCH resource region (e.g., PSFCH resource pool), and may transmit only NACK to a transmitting terminal (e.g., terminal transmitting the sidelink data) by using the PSFCH resource region.

In this case, the receiving terminal may not transmit ACK to the transmitting terminal when the sidelink data has been successfully received, and may transmit NACK to the transmitting terminal when the reception of the sidelink data has failed. This scheme may be referred to as a 'NACK-only feedback scheme'. In exemplary embodiments, "data, information, and/or signal is successfully received" may mean that "decoding of the data, information, and/or signal is successful". "reception of data, information, and/or signal fails" may mean "decoding of the data, information, and/or signal fails".

In the second scheme, a PSFCH resource region may be independently allocated (e.g., configured) to each of the receiving terminals, and each receiving terminal may transmit a HARQ response (e.g., ACK, NACK, or DTX) to the transmitting terminal by using the allocated PSFCH resource region (e.g., dedicated PSFCH resource region). In addition, for transmission of HARQ responses, a combination of the first and second scheme described above may be used. Here, a PSFCH may be in form of a sequence.

Figure 7:
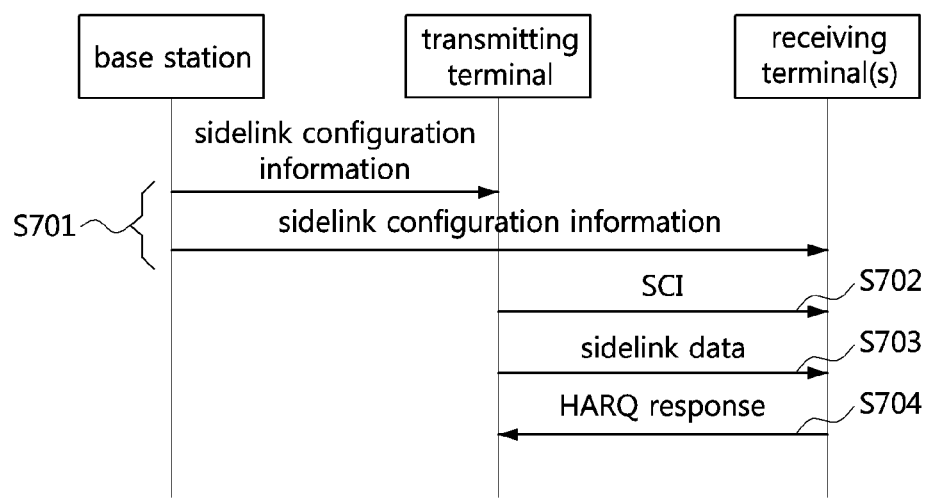
FIG. 7 is a sequence chart illustrating a first exemplary embodiment of a method for transmitting and receiving HARQ responses in a communication system supporting sidelink communication.

FIG. 7 is a sequence chart illustrating a first exemplary embodiment of a method for transmitting and receiving HARQ responses in a communication system supporting sidelink communication.

As shown in FIG. 7, a communication system may include a base station, a transmitting terminal, and receiving terminal(s). The transmitting terminal may be a terminal transmitting sidelink data (e.g., PSSCH), and the receiving terminal(s) may be a terminal receiving the sidelink data. The base station may be the base station 210 shown in FIG. 2. The transmitting terminal may be the UE 235 shown in FIG. 2, and the receiving terminal(s) may be the UE 236 shown in FIG. 2. Alternatively, the transmitting terminal may be the UE 236 shown in FIG. 2, and the receiving terminal(s) may be the UE 235 shown in FIG. 2. Each of the transmitting terminal and the receiving terminal(s) may be located in a corresponding vehicle. The base station, transmitting terminal, and receiving terminal(s) may be configured identically or similarly to the communication node 300 shown in FIG. 3. The transmitting terminal and receiving terminal(s) may support the protocol stacks shown in FIGS. 4 to 6. The transmitting terminal and receiving terminal(s) may be connected to the base station, and may perform sidelink communication based on scheduling of the base station. Alternatively, the transmitting terminal and receiving terminal(s) may be located outside coverage of the base station, and may perform sidelink communication without scheduling of the base station.

The base station may generate sidelink configuration information and transmit the sidelink configuration information through higher layer signaling (S701). The terminals (e.g., transmitting terminal and receiving terminal(s)) may receive the sidelink configuration information from the base station, and may perform sidelink communication based on the sidelink configuration information. Here, the transmitting terminal and the receiving terminal(s) may perform sidelink-groupcast communication.

The transmitting terminal may generate SCI including scheduling information (e.g., resource allocation information) of sidelink data (e.g., PSSCH), and may transmit the SCI to the receiving terminal(s) (S702). The SCI may include a '1st-stage SCI', or both a '1st-stage SCI' and a '2nd-stage SCI'. The SCI (e.g., 1st-stage SCI) may be transmitted on a PSCCH, and the 2nd-stage SCI may be transmitted on a PSSCH. The SCI may be a common SCI transmitted to all receiving terminals participating in sidelink-groupcast communication. Alternatively, the SCI may be a dedicated SCI transmitted to each of the receiving terminals participating in sidelink-groupcast communication.

The 1st-stage SCI may include at least one information element among priority information, frequency resource assignment information, time resource assignment information, resource reservation period information, DMRS pattern information, 2nd-stage SCI format information, beta offset indicator, the number of DMRS ports, modulation and coding scheme (MCS) information, and combinations thereof. The 2nd-stage SCI may include at least one information element among a HARQ processor identifier (ID), redundancy version (RV), source ID, destination ID, CSI request information, zone ID, communication range requirements, and combinations thereof. In addition, the SCI (e.g., 1st-stage SCI and/or 2nd-stage SCI) may further include information indicating a PSFCH resource for HARQ feedback (e.g., frequency resource assignment information, time resource assignment information) and/or information for transmitting a HARQ feedback.

The receiving terminal(s) may receive the SCI (e.g., 1st-stage SCI and/or 2nd-stage SCI) from the transmitting terminal, and may identify information elements (e.g., PSSCH resource information, PSFCH resource information, etc.) included in the SCI. The transmitting terminal may transmit sidelink data to the receiving terminal(s) on a PSSCH indicated by the SCI (S703). The receiving terminal(s) may receive the sidelink data from the transmitting terminal by performing a monitoring operation on the PSSCH.

Each of the receiving terminal(s) may transmit, to the transmitting terminal, a HARQ response to the sidelink data on a PSFCH indicated by the SCI (S704). Alternatively, the PSFCH may be configured by higher layer signaling. If decoding of the sidelink data is successful, ACK for the sidelink data may be transmitted in the step S704. If decoding of the sidelink data fails, NACK for the sidelink data may be transmitted in the step S704. Alternatively, the NACK-only feedback scheme may be used. In this case, if decoding of the sidelink data is successful, ACK for the sidelink data may not be transmitted in the step S704. If decoding of the sidelink data fails, NACK for the sidelink data may be transmitted in the step S704.

The transmitting terminal may receive the HARQ response(s) from the receiving terminal(s) by performing a monitoring operation on the PSFCH. When the HARQ response indicates ACK, the transmitting terminal may determine that the sidelink data has been successfully received at the receiving terminal(s). When the HARQ response indicates NACK, the transmitting terminal may determine that reception of the sidelink data has failed at the receiving terminal(s). Alternatively, the NACK-only feedback scheme may be used. In this case, if a HARQ response is not received, the transmitting terminal may determine that the sidelink data has been successfully received at the receiving terminal(s). If NACK is received, the transmitting terminal may determine that reception of the sidelink data at the receiving terminal(s) has failed. When it is determined that the receiving terminal(s) has failed to receive the sidelink data, the transmitting terminal may perform a retransmission procedure for the sidelink data.

[PSFCH Structure]

One PSFCH (e.g., one PSFCH resource region) may be configured for transmission of HARQ response(s) of the receiving terminal(s). The transmitting terminal may distinguish HARQ responses (e.g., ACK or NACK) of a plurality of receiving terminals based on PSFCHs (e.g., feedback resource region belonging to the PSFCH) allocated the respective receiving terminals and/or sequences configured for the respective receiving terminals. The sequences (e.g., sequences mapped to the HARQ responses) used by the receiving terminals for transmission of the HARQ responses may be orthogonal sequences. For example, a receiving terminal #1 may transmit a HARQ response using a sequence #1, and a receiving terminal #2 may transmit a HARQ response using a sequence #2. The operation of transmitting a HARQ response using a sequence may mean an operation of transmitting the sequence mapped to the HARQ response. Here, the sequence #1 may be orthogonal to the sequence #2. One PSFCH on which HARQ response(s) are transmitted/received may be configured with a plurality of feedback resource regions. For example, the PSFCH (e.g., PSFCH resource region) may be configured as follows.

Figure 8A:
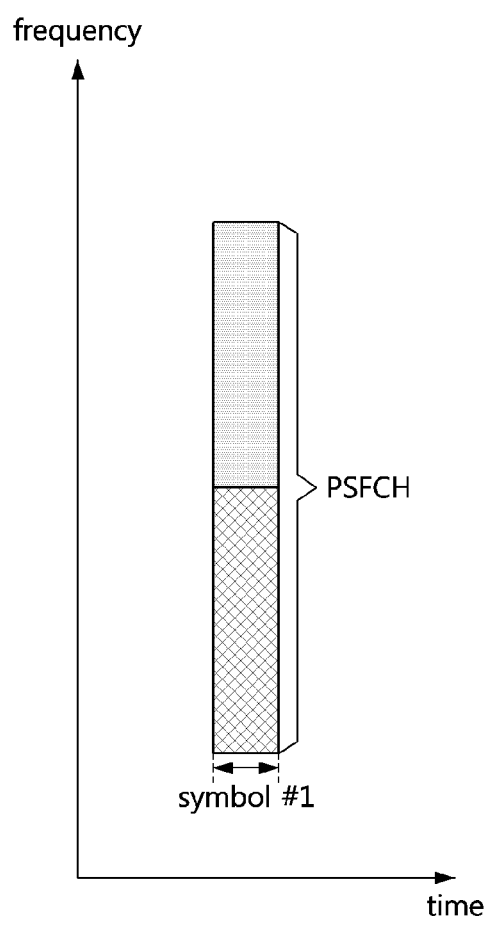
FIG. 8A is a conceptual diagram illustrating a first exemplary embodiment of a PSFCH including one or more feedback resource regions in a communication system supporting sidelink communication.
Figure 8B:
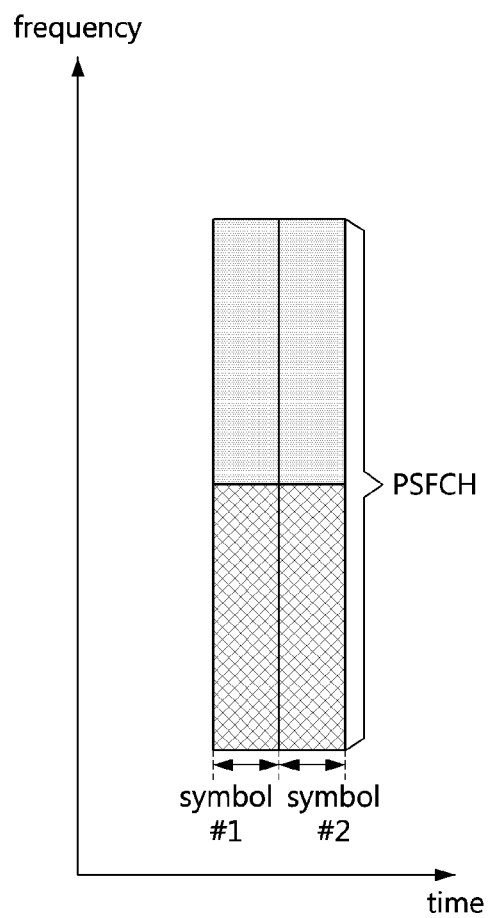
FIG. 8B is a conceptual diagram illustrating a second exemplary embodiment of a PSFCH including one or more feedback resource regions in a communication system supporting sidelink communication.
Figure 8C:
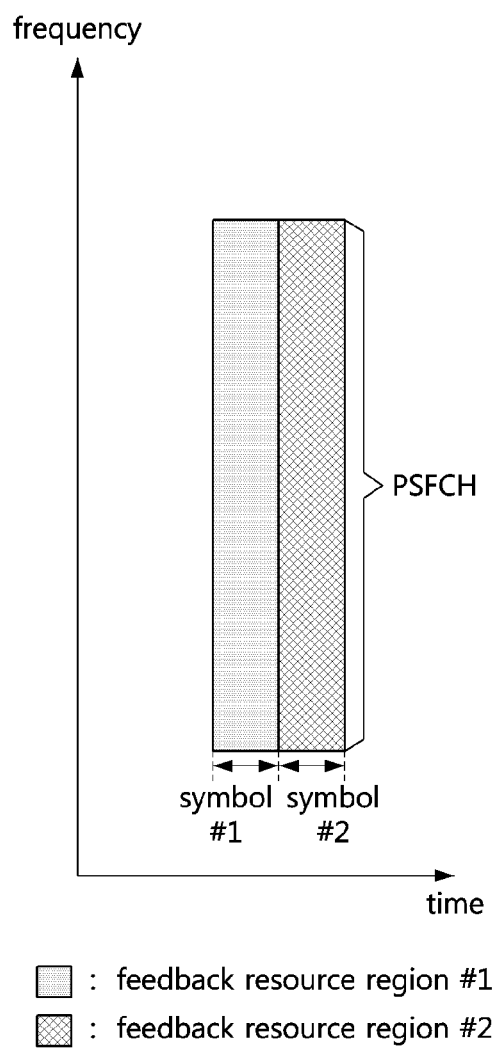
FIG. 8C is a conceptual diagram illustrating a third exemplary embodiment of a PSFCH including one or more feedback resource regions in a communication system supporting sidelink communication.

FIG. 8A is a conceptual diagram illustrating a first exemplary embodiment of a PSFCH including one or more feedback resource regions in a communication system supporting sidelink communication, FIG. 8B is a conceptual diagram illustrating a second exemplary embodiment of a PSFCH including one or more feedback resource regions in a communication system supporting sidelink communication, and FIG. 8C is a conceptual diagram illustrating a third exemplary embodiment of a PSFCH including one or more feedback resource regions in a communication system supporting sidelink communication.

As shown in FIGS. 8A to 8C, one PSFCH may include feedback resource regions #1 and #2. The PSFCH may be configured in one or more resource blocks (RBs) in the frequency domain, and may be configured in one or more symbols in the time domain. In the exemplary embodiment shown in FIG. 8A, the PSFCH may be configured in one symbol in the time domain, and the feedback resource region #1 may be multiplexed with the feedback resource region #2 in the frequency domain. In the exemplary embodiment shown in FIG. 8B, the PSFCH may be configured in two symbols in the time domain, and the feedback resource region #1 may be multiplexed with the feedback resource region #2 in the frequency domain.

In the exemplary embodiment shown in FIG. 8C, the PSFCH may be configured in two symbols in the time domain, and the feedback resource region #1 may be multiplexed with the feedback resource region #2 in the time domain. For example, the feedback resource region #1 may be arranged in a symbol #1, and the feedback resource region #2 may be arranged in a symbol #2. Alternatively, the feedback resource region #1 may be arranged in the symbol #2, and the feedback resource region #2 may be arranged in the symbol #1.

[Sequence-Based HARQ Response Transmission Method]

A HARQ response may be transmitted/received based on an 'ACK/NACK feedback scheme' or a 'NACK-only feedback scheme'. When the ACK/NACK feedback scheme is used, the number of feedback resource regions included in one PSFCH is n, and the number of sequences (e.g., orthogonal sequences) usable in one feedback resource region is m, the transmitting terminal may be able to distinguish HARQ responses (e.g., ACK or NACK) received from n×(m/2) receiving terminals in one PSFCH. "m sequences (e.g., a maximum of m sequences) are usable in one feedback resource region" may mean "the transmitting terminal is able to identify each of m sequences received in the same physical resource region (e.g., one feedback resource region)". The operation of discriminating the sequences may include an operation of identifying whether a HARQ response mapped to each sequence is ACK or NACK, and an operation of identifying a receiving terminal transmitting the HARQ response mapped to the sequence.

For example, a PSFCH may include two feedback resource regions, and a maximum of eight sequences (e.g., orthogonal sequences) may be used in one feedback resource region. In this case, when the ACK/NACK feedback scheme is used, the maximum number of receiving terminals that the transmitting terminal can distinguish in the same feedback resource region may be four. That is, when four receiving terminals transmit HARQ responses (e.g., ACK or NACK) in the same feedback resource region, the transmitting terminal may be able to identify whether a HARQ response received from each of the four receiving terminals is ACK or NACK. The eight sequences may be reused in different feedback resource regions. When one PSFCH includes two feedback resource regions, the transmitting terminal may identify whether a HARQ response received from each of up to eight receiving terminals in one PSFCH is ACK or NACK. In this case, feedback resource regions and sequences allocated to the respective receiving terminals may be as shown in Table 3 below. The exemplary embodiment described in Table 3 below may be referred to as a 'sequence pattern #1'. The operation of allocating the feedback resource regions and sequences may be performed through one or a combination of two or more of higher layer signaling, MAC signaling, and PHY signaling.

TABLE 3

|  | | Sequence | |
| --- | --- | --- | --- |
|  | Receiving terminal | ACK | NACK |
| Feedback resource region #1 | Receiving terminal #1 | Sequence #1 | Sequence #2 |
|  | Receiving terminal #2 | Sequence #3 | Sequence #4 |
|  | Receiving terminal #3 | Sequence #5 | Sequence #6 |
|  | Receiving terminal #4 | Sequence #7 | Sequence #8 |
| Feedback resource region #2 | Receiving terminal #5 | Sequence #1 | Sequence #2 |
|  | Receiving terminal #6 | Sequence #3 | Sequence #4 |
|  | Receiving terminal #7 | Sequence #5 | Sequence #6 |
|  | Receiving terminal #8 | Sequence #7 | Sequence #8 |

As another exemplary embodiment when the ACK/NACK feedback scheme is used, sequences may be used to identify ACKs for the respective receiving terminals, and one sequence may be used for NACKs of a plurality of receiving terminals. That is, the sequence for NACK may be used to identify NACK from among ACK and NACK, and may not be used to identify NACK for each receiving terminal. In this case, the feedback resource regions and sequences allocated to the respective receiving terminals may be as shown in Table 4 below. The exemplary embodiment described in Table 4 may be referred to as a 'sequence pattern #2'. The operation of allocating the feedback resource regions and sequences may be performed through one or a combination of two or more of higher layer signaling, MAC signaling, and PHY signaling.

TABLE 4

|  | Receiving terminal | Sequence | |
|---|---|---|---|
|  |  | ACK | NACK |
| Feedback resource region #1 | Receiving terminal #1 | Sequence #2 | Sequence #1 |
|  | Receiving terminal #2 | Sequence #3 | Sequence #1 |
|  | Receiving terminal #3 | Sequence #4 | Sequence #1 |
|  | Receiving terminal #4 | Sequence #5 | Sequence #1 |
|  | Receiving terminal #5 | Sequence #6 | Sequence #1 |
|  | Receiving terminal #6 | Sequence #7 | Sequence #1 |
|  | Receiving terminal #7 | Sequence #8 | Sequence #1 |
| Feedback resource region #2 | Receiving terminal #8 | Sequence #2 | Sequence #1 |
|  | Receiving terminal #9 | Sequence #3 | Sequence #1 |
|  | Receiving terminal #10 | Sequence #4 | Sequence #1 |
|  | Receiving terminal #11 | Sequence #5 | Sequence #1 |
|  | Receiving terminal #12 | Sequence #6 | Sequence #1 |
|  | Receiving terminal #13 | Sequence #7 | Sequence #1 |
|  | Receiving terminal #14 | Sequence #8 | Sequence #1 |

In the exemplary embodiment described in Table 4, a sequence #1 may be used to identify NACK from among ACK and NACK, and sequences #2 to #8 may be used to identify ACKs for the respective receiving terminals. In this case, in one feedback resource region, the transmitting terminal may be able to identify ACK received from each of up to seven receiving terminals. In the PSFCH including two feedback resource regions, the transmitting terminal may be able to identify ACK received from each of up to fourteen receiving terminals. When the sequence #1 (e.g., NACK) is detected, the transmitting terminal may determine that one or more receiving terminals (e.g., one or more receiving terminals excluding receiving terminal(s) having transmitted ACK among a plurality of receiving terminals) have transmitted NACK.

As another exemplary embodiment when the ACK/NACK feedback scheme is used, one feedback resource region (e.g., feedback resource region #1) among a plurality of feedback resource regions included in one PSFCH may be used for transmission and reception of ACK, and another feedback resource region (e.g., feedback resource region #2) may be used for transmission and reception of NACK. Sequences #1 to #8 in the feedback resource region #1 may be used to identify ACKs for the respective receiving terminals, and one sequence (e.g., any sequence, arbitrary sequence, or specific sequence) may be used to detect NACK in the feedback resource region #2. In this case, feedback resource regions and sequences allocated to the respective receiving terminals may be as shown in Table 5 below. The exemplary embodiment described in Table 5 below may be referred to as a 'sequence pattern #3'. The operation of allocating the feedback resource regions and sequences may be performed through one or a combination of two or more of higher layer signaling, MAC signaling, and PHY signaling.

TABLE 5

|  | Receiving terminal | Sequence | |
|---|---|---|---|
|  |  | ACK | NACK |
| Feedback resource region #1 | Receiving terminal #1 | Sequence #1 | — |
|  | Receiving terminal #2 | Sequence #2 |  |
|  | Receiving terminal #3 | Sequence #3 |  |
|  | Receiving terminal #4 | Sequence #4 |  |
|  | Receiving terminal #5 | Sequence #5 |  |
|  | Receiving terminal #6 | Sequence #6 |  |
|  | Receiving terminal #7 | Sequence #7 |  |
|  | Receiving terminal #8 | Sequence #8 |  |
| Feedback resource region #2 | All receiving terminals | — | Arbitrary sequence |

According to the exemplary embodiment shown in Table 5, the transmitting terminal may identify ACK received from each of up to eight receiving terminals in the feedback resource region #1, and may identify whether NACK is received by performing an energy detection operation or a sequence detection operation on the feedback resource region #2. In the exemplary embodiment shown in Table 5, by performing an energy detection operation instead of a sequence detection operation, it may be identified whether NACK is received. On the other hand, in the exemplary embodiment shown in Table 4, an energy detection operation cannot be performed, and whether NACK is received may be identified by performing a sequence detection operation. Accordingly, the reception performance according to the exemplary embodiment shown in Table 5 can be improved than the reception performance according to the exemplary embodiment shown in Table 4, and the reception complexity according to the exemplary embodiment shown in Table 5 may be reduced than the reception complexity according to the exemplary embodiment shown in Table 4.

On the other hand, when the NACK-only feedback scheme is used, one PSFCH includes two feedback resource regions, and eight sequences are usable in one feedback resource region, the feedback resource regions and sequences allocated to the respective receiving terminals may be as shown in Table 6 below. The exemplary embodiment described in Table 6 below may be referred to as a 'sequence pattern #4'. The operation of allocating the feedback resource regions and sequences may be performed through one or a combination of two or more of higher layer signaling, MAC signaling, and PHY signaling.

TABLE 6

|  | Receiving terminal | Sequence | |
|---|---|---|---|
|  |  | ACK | NACK |
| Feedback resource region #1 | Receiving terminal #1 | — | Sequence #1 |
|  | Receiving terminal #2 |  | Sequence #2 |
|  | Receiving terminal #3 |  | Sequence #3 |
|  | Receiving terminal #4 |  | Sequence #4 |
|  | Receiving terminal #5 |  | Sequence #5 |
|  | Receiving terminal #6 |  | Sequence #6 |
|  | Receiving terminal #7 |  | Sequence #7 |
|  | Receiving terminal #8 |  | Sequence #8 |
| Feedback resource region #2 | Receiving terminal #9 | — | Sequence #1 |
|  | Receiving terminal #10 |  | Sequence #2 |
|  | Receiving terminal #11 |  | Sequence #3 |
|  | Receiving terminal #12 |  | Sequence #4 |
|  | Receiving terminal #13 |  | Sequence #5 |
|  | Receiving terminal #14 |  | Sequence #6 |
|  | Receiving terminal #15 |  | Sequence #7 |
|  | Receiving terminal #16 |  | Sequence #8 |

In Table 6, sequences #1 to #8 may be used to identify NACKs for the respective receiving terminals. In this case, the transmitting terminal may be able to identify NACK received from each of up to eight receiving terminals in one feedback resource region, and may identify NACK received from each of up to sixteen receiving terminals in the PSFCH including two feedback resource regions.

As another exemplary embodiment when the NACK-only feedback scheme is used, one sequence (e.g., sequence #1) may be used for NACKs of all receiving terminals. That is, one sequence mapped to NACKs of all receiving terminals may be configured. In this case, the feedback resource regions and sequences allocated to the respective receiving terminals may be as shown in Table 7 below. The exemplary embodiment shown in Table 7 below may be referred to as a 'sequence pattern #5'. The operation of allocating the feedback resource regions and sequences may be performed through one or a combination of two or more of higher layer signaling, MAC signaling, and PHY signaling.

TABLE 7

|  |  | Sequence | |
| --- | --- | --- | --- |
| Receiving terminal | ACK | NACK |
| Feedback resource region #1 (or, PSFCH) | All receiving terminals | — | Sequence #1 |

In the exemplary embodiment shown in Table 7, the transmitting terminal may identify whether NACK is received by performing an energy detection operation or a sequence detection operation on the feedback resource region #1 (or PSFCH). When the sequence #1 (e.g., NACK) is detected, the transmitting terminal may determine that NACK has been transmitted from one or more receiving terminals.

Each of the above-described sequence patterns #1 to #5 may be one of exemplary embodiments applied to the present disclosure, and sequence pattern(s) modified based on the above-described sequence patterns #1 to #5 may also be applied to the present disclosure.

Meanwhile, the following sidelink communication (e.g., sidelink-groupcast communication) may be performed based on the above-described 'PSFCH structure' and 'sequence-based HARQ response transmission method'.

Figure 9:
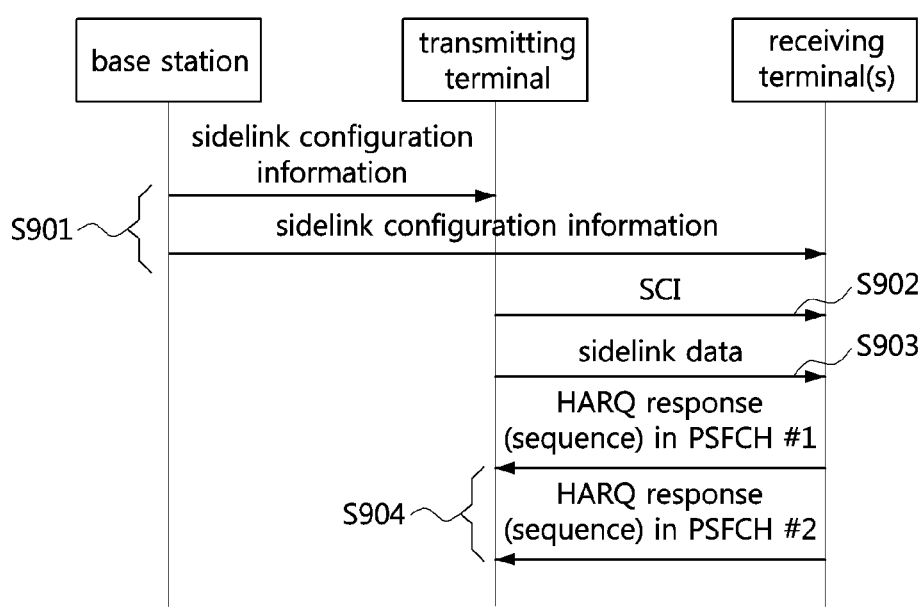
FIG. 9 is a sequence chart illustrating a second exemplary embodiment of a method for transmitting and receiving HARQ responses in a communication system supporting sidelink communication.

FIG. 9 is a sequence chart illustrating a second exemplary embodiment of a method for transmitting and receiving HARQ responses in a communication system supporting sidelink communication.

As shown in FIG. 9, a communication system may include a base station, a transmitting terminal, and receiving terminal(s). The transmitting terminal may be a terminal transmitting sidelink data (e.g., PSSCH), and the receiving terminal(s) may be terminal(s) receiving the sidelink data. The base station may be the base station 210 shown in FIG. 2. The transmitting terminal may be the UE 235 shown in FIG. 2, and the receiving terminal(s) may be the UE 236 shown in FIG. 2. Alternatively, the transmitting terminal may be the UE 236 shown in FIG. 2, and the receiving terminal(s) may be the UE 235 shown in FIG. 2. Each of the transmitting terminal and receiving terminal(s) may be located in a corresponding vehicle. The base station, transmitting terminal, and receiving terminal(s) may be configured identically or similarly to the communication node 300 shown in FIG. 3. The transmitting terminal and receiving terminal(s) may support the protocol stacks shown in FIGS. 4 to 6. The transmitting terminal and receiving terminal(s) may be connected to the base station, and may perform sidelink communication based on scheduling of the base station. Alternatively, the transmitting terminal and receiving terminal(s) may be located outside coverage of the base station, and may perform sidelink communication without scheduling of the base station.

The base station may generate sidelink configuration information and transmit the sidelink configuration information through higher layer signaling (S901). The sidelink configuration information may include PSFCH configuration information (e.g., SL-PSFCH-Config). The PSFCH configuration information may include one or more information elements among information elements shown in Table 8 below. When a plurality of PSFCHs (e.g., PSFCH #1 and #2) are used, the sidelink configuration information may include PSFCH configuration information #1 for the PSFCH #1 and PSFCH configuration information #2 for the PSFCH #2. When the number of terminals (e.g., receiving terminals) participating in sidelink communication (e.g., sidelink-groupcast communication) is less than or equal to a threshold, one PSFCH (e.g., PSFCH #1) may be used, and when the number of terminals participating in sidelink communication exceeds a threshold, a plurality of PSFCHs (e.g., PSFCHs #1 and #2) may be used. Each of the PSFCH configuration information #1 and the PSFCH configuration information #2 may include one or more information elements among information elements shown in Table 8 below.

TABLE 8

| | |
| --- | --- |
| sl-PSFCH-Period | sl-PSFCH-Period may indicate a period of a PSFCH resource region within a resource pool. sl-PSFCH-Period may be set in units of slots. |
| sl-PSFCH_Duration | sl-PSFCH-Duration may indicate a length of a PSFCH resource region in the time domain. sl-PSFCH-Duration may be set in units of symbols. For example, sl-PSFCH-Duration may indicate one, two, three, or four symbols. |
| sl-PSFCH-RB-Set | sl-PSFCH-RB-Set may indicate a set of PRBs (e.g., the number of PRBs included in the set of PRBs) of a PSFCH resource region used for transmitting and receiving PSFCH(s). The set of PRBs may include one or more PRBs (e.g., RBs). |
| sl-Feedback-RB-Set1 | sl-Feedback-RB-Set1 may indicate a set of PRBs (e.g., the number of PRBs included in the set of PRBs) of a feedback resource region #1 included in a PSFCH resource region. The set of PRBs may include one or more PRBs (e.g., RBs). |
| sl-Feedback-RB-Set2 | sl-Feedback-RB-Set1 may indicate a set of PRBs (e.g., the number of PRBs included in the set of PRBs) of a feedback resource region #2 included in a PSFCH resource region. The set of PRBs may include one or more PRBs (e.g., RBs). |
| sl-Feedback-Sym1 | sl-Feedback-Sym1 may indicate the number and/or index(es) of symbol(s) in which a feedback resource region #1 is disposed, when a PSFCH resource region is configured with a plurality of symbols. |
| sl-Feedback-Sym2 | sl-Feedback-Sym2 may indicate the number and/or index(es) of symbol(s) in which a feedback resource region #2 is disposed, when a PSFCH resource region is configured with a plurality of symbols. |

When a PSFCH resource region (e.g., PSFCH) includes one feedback resource region, the PSFCH configuration information may include configuration information (e.g., sl-Feedback-RB-Set1, sl-Feedback-Sym1) of one feedback resource region. When a PSFCH resource region includes a plurality of feedback resource regions, the PSFCH configuration information may include configuration information (e.g., sl-Feedback-RB-Set1, sl-Feedback-Sym1, sl-Feedback-RB-Sett, sl-Feedback-Sym2) of the plurality of feedback resource regions.

The PSFCH configuration information (or sidelink configuration information) may further include configuration information on a HARQ feedback scheme. The HARQ feedback scheme may include the ACK/NACK feedback scheme and the NACK-only feedback scheme. In sidelink-groupcast communication, an appropriate HARQ feedback scheme may be used according to various requirements. The configuration information on the HARQ feedback scheme may be configured as shown in Table 9 or Table 10 below.

TABLE 9

| Information element | Description |
|---|---|
| sl-HARQ-Type1 | sl-HARQ-Type1 may indicate whether the ACK/NACK feedback scheme is used. sl-HARQ-Type1 set to 0 may indicate that the ACK/NACK feedback scheme is not used. sl-HARQ-Type1 set to 1 may indicate that the ACK/NACK feedback scheme can be used. |
| sl-HARQ-Type2 | sl-HARQ-Type2 may indicate whether the NACK-only feedback scheme is used. sl-HARQ-Type2 set to 0 may indicate that the NACK-only feedback scheme is not used. sl-HARQ-Type2 set to 1 may indicate that the NACK-only feedback scheme can be used. |

When one of sl-HARQ-Type1 and sl-HARQ-Type2 is indicated to be available, the HARQ feedback scheme (e.g., ACK/NACK feedback scheme or NACK-only feedback scheme) configured by higher layer signaling may be used in sidelink communication. When both sl-HARQ-Type1 and sl-HARQ-Type2 are indicated to be available by higher layer signaling, one HARQ feedback scheme applied to sidelink communication may be indicated by higher layer signaling (e.g., a higher layer signaling message different from the higher layer signaling message indicating Table 9), MAC signaling, and/or PHY signaling.

TABLE 10

| Information element | Description |
|---|---|
| sl-Default-HARQ-Type | sl-Default-HARQ-Type may indicate a default HARQ feedback scheme or a current HARQ feedback scheme. sl-Default-HARQ-Type set to 0 may indicate the ACK/NACK feedback scheme. sl-Default-HARQ-Type set to 1 may indicate the NACK-only feedback scheme. |

Sidelink communication may be performed based on a HARQ feedback scheme indicated by sl-Default-HARQ-Type. Maintenance or change of the HARQ feedback scheme configured the by higher layer signaling may be indicated by higher layer signaling (e.g., a higher layer signaling message different from the higher layer signaling message indicating Table 10), MAC signaling, and/or PHY signaling. For example, when a toggle bit included in an RRC message, MAC CE, or control information (e.g., DCI or SCI) is set to 0, this may indicate that the HARQ feedback scheme configured by the higher layer signaling (e.g., sl-Default-HARQ-Type) is to be maintained. When the toggle bit included in the RRC message, MAC CE, or control information (e.g., DCI or SCI) is set to 1, this may indicate that the HARQ feedback scheme configured by the higher layer signaling (e.g., sl-Default-HARQ-Type) is to be changed.

For example, when the HARQ feedback scheme configured by the higher layer signaling is the ACK/NACK feedback scheme and the toggle bit included in the RRC message, MAC CE, or control information is set to 1, the HARQ feedback scheme may be changed from the ACK/NACK feedback scheme to the NACK-only feedback scheme. When the HARQ feedback scheme configured by the higher layer signaling is the NACK-only feedback scheme, and the toggle bit included in the RRC message, MAC CE, or control information is set to 1, the HARQ feedback scheme may be changed from the NACK-only feedback scheme to the ACK/NACK feedback scheme.

The PSFCH configuration information (or sidelink configuration information) may further include sequence pattern configuration information. The sequence pattern configuration information may include one or more information elements described in Table 11 below.

TABLE 11

| Information element | Description |
|---|---|
| sl-Maxnum-Sequence | sl-Maxum-Sequence may indicate the maximum number of sequences in usable in a PSFCH resource region (or, feedback resource region). |
| sl-Sequence-Pattern | sl-Sequence-Pattern may indicate sequence pattern candidates used for HARQ response transmission or one sequence pattern. |

In Table 11, sl-Sequence-Pattern may indicate {sequence pattern #1, sequence pattern #2, sequence pattern #3, sequence pattern #4, sequence pattern #5} as sequence pattern candidates. The sequence pattern #1 may be the sequence pattern described in Table 3 above, the sequence pattern #2 may be the sequence pattern described in Table 4 above, and the sequence pattern #3 may be the sequence pattern described in Table 5 above. The sequence pattern #4 may be the sequence pattern described in Table 6 above, and the sequence pattern #5 may be the sequence pattern described in Table 7 above. When sequence pattern candidates are indicated by higher layer signaling, one sequence pattern used in sidelink communication may be indicated by higher layer signaling (e.g., a higher layer signaling message different from the higher layer signaling message indicating the sequence pattern candidates), MAC signaling, and/or PHY signaling.

Alternatively, one specific sequence pattern may be indicated by higher layer signaling. In this case, the sidelink communication may be performed using the sequence pattern indicated by the higher layer signaling. In another exemplary embodiment, the information element(s) shown in Tables 8 to 11 may be transmitted through one or a combination of two or more of higher layer signaling, MAC signaling, and PHY signaling. The information element(s) listed in Tables 8 to 11 may be indicated implicitly or explicitly.

Meanwhile, the transmitting terminal and/or the receiving terminal(s) may receive the higher layer message from the base station, and may identify the sidelink configuration information (e.g., PSFCH configuration information) included in the higher layer message. The PSFCH configuration information may include one or more information elements listed in Tables 8 to 11. The transmitting terminal and/or the receiving terminal(s) may perform sidelink communication (e.g., sidelink-groupcast communication) using the sidelink configuration information.

For example, the transmitting terminal may generate SCI (e.g., 1st-stage SCI and/or 2nd-stage SCI) including scheduling information for transmission of sidelink data, and transmit the SCI to the receiving terminal(s) (S902). The SCI may be transmitted on a PSCCH and/or PSSCH. The SCI may be a common SCI transmitted to all receiving terminals participating in sidelink-groupcast communication. Alternatively, the SCI may be a dedicated SCI transmitted to each of the receiving terminals participating in sidelink-groupcast communication. The SCI may further include PSFCH resource information for HARQ feedback transmission for sidelink data as well as the scheduling information. For example, the SCI may further include one or more information elements listed in Table 12 below. Alternatively, one or more information elements listed in Table 12 below may be indicated by MAC signaling or a combination of MAC signaling and PHY signaling. One or more information elements listed in Table 12 below may be indicated implicitly or explicitly.

TABLE 12

| Information element | Description |
| --- | --- |
| PSFCH1-UE-id | PSFCH1-UE-id may be information (e.g., terminal IDs, terminal indexes, group ID, group index) indicating terminals using a PSFCH #1 when a plurality of PSFCHs are configured. |
| PSFCH2-UE-id | PSFCH2-UE-id may be information (e.g., terminal IDs, terminal indexes, group ID, group index) indicating terminals using a PSFCH #2 when a plurality of PSFCHs are configured. |

TABLE 12-continued

| Information element | Description |
| --- | --- |
| Feedback1-UE-id | Feedback1-UE-id may be information (e.g., terminal IDs, terminal indexes, group ID, group index) indicating terminals using a feedback resource region #1 when one PSFCH includes a plurality of feedback resource regions. |
| Feedback2-UE-id | Feedback2-UE-id may be information (e.g., terminal IDs, terminal indexes, group ID, group index) indicating terminals using a feedback resource region #2 when one PSFCH includes a plurality of feedback resource regions. |
| HARQ-indicator | HARQ-indicator may indicate a HARQ feedback scheme used for sidelink communication. |
| HARQ-toggle | HARQ-toggle may indicate whether a HARQ feedback scheme used for sidelink communication is changed. |
| SequencePattern-indicator | SequencePattern-indicator may indicate a sequence pattern used for sidelink communication. |
| Sequence-indicator | Sequence-indicator may indicate sequences allocated to respective terminals. When Sequence-indicator is not present, the terminals may generate sequences according to a rule (e.g., equation) that the terminals know, and the generated sequences may be orthogonal to each other. |

The receiving terminal(s) may receive SCI from the transmitting terminal, and may identify information element(s) included in the SCI. The transmitting terminal may transmit sidelink data on a PSSCH indicated by the SCI (S903). The sidelink data may be transmitted to one or more receiving terminals in a groupcast scheme. The receiving terminal(s) may perform a monitoring operation on the PSSCH indicated by the SCI to obtain the sidelink data. The receiving terminal(s) may transmit HARQ response(s) to the transmitting terminal based on result(s) of receiving the sidelink data (S904). Sequence(s) mapped to the HARQ response(s) in the step S904 may be transmitted on a PSFCH (e.g., feedback resource region). The step S904 may be performed as follows.

[Case A]

Information elements shown in Table 13 below may be configured by the above-described signaling scheme. When one or more PSFCHs are configured, a PSFCH #1 may be one PSFCH among the one or more PSFCHs. When the PSFCH #1 includes one or more feedback resource regions, the feedback resource region #1 may be one feedback resource region among the one or more feedback resource regions.

TABLE 13

| | HARQ feedback scheme | PSFCH | Feedback resource region | Sequence pattern | Sequence | |
| --- | --- | --- | --- | --- | --- | --- |
| Receiving terminal #1 | ACK/NACK feedback scheme | PSFCH #1 | Feedback resource region #1 | Sequence pattern #1 | ACK | Sequence #1 |
| | | | | | NACK | Sequence #2 |

TABLE 13-continued

| | HARQ feedback scheme | PSFCH | Feedback resource region | Sequence pattern | Sequence | |
|---|---|---|---|---|---|---|
| Receiving terminal #2 | ACK/NACK feedback scheme | PSFCH #1 | Feedback resource region #1 | Sequence pattern #1 | ACK | Sequence #3 |
| | | | | | NACK | Sequence #4 |

The receiving terminal #1 may successfully receive the sidelink data from the transmitting terminal, and the receiving terminal #2 may fail to receive the sidelink data. In this case, the receiving terminal #1 may transmit the sequence #1 mapped to ACK to the transmitting terminal through the feedback resource region #1 within the PSFCH #1 (S904), and the receiving terminal #2 may transmit the sequence #4 mapped to NACK to the transmitting terminal through the feedback resource region #1 within the PSFCH #1 (S904). That is, ACK (e.g., sequence #1) of the receiving terminal #1 and NACK (e.g., sequence #4) of the receiving terminal #2 may be transmitted using the same feedback resource region.

The transmitting terminal knows the configuration of the information elements shown in Table 13, and may perform a monitoring operation on the feedback resource region #1 within the PSFCH #1 in order to receive the HARQ responses of the receiving terminals #1 and #2. Since the sequence #1 is orthogonal to the sequence #4, the transmitting terminal may detect the sequences #1 and #4 in the feedback resource region #1 within the PSFCH #1. Accordingly, the transmitting terminal may determine that decoding of the sidelink data is successful in the receiving terminal #1, and may determine that the decoding of the sidelink data in the receiving terminal #2 has failed.

[Case B]

Information elements shown in Table 14 below may be configured by the above-described signaling scheme. When one or more PSFCHs are configured, a PSFCH #1 may be one PSFCH among the one or more PSFCHs. When the PSFCH #1 includes one or more feedback resource regions, a feedback resource region #1 may be one feedback resource region among the one or more feedback resource regions.

The receiving terminal #1 may successfully receive sidelink data from the transmitting terminal, and the receiving terminal #2 may fail to receive the sidelink data. In this case, the receiving terminal #1 may transmit the sequence #2 mapped to ACK to the transmitting terminal through the feedback resource region #1 within the PSFCH #1 (S904), and the receiving terminal #2 may transmit the sequence #1 mapped to NACK to the transmitting terminal through the feedback resource region #1 within the PSFCH #1 (S904). That is, ACK (e.g., sequence #2) of the receiving terminal #1 and NACK (e.g., sequence #1) of the receiving terminal #2 may be transmitted using the same feedback resource region.

The transmitting terminal knows the configuration of the information elements shown in Table 14, and may perform a monitoring operation on the feedback resource region #1 within the PSFCH #1 in order to receive the HARQ responses of the receiving terminals #1 and #2. Since the sequence #1 is orthogonal to the sequence #2, the transmitting terminal may detect the sequences #1 and #2 in the feedback resource region #1 within the PSFCH #1. Accordingly, the transmitting terminal may determine that decoding of the sidelink data is successful in the receiving terminal #1, and may determine that decoding of the sidelink data in one or more receiving terminals has failed. Here, the one or more receiving terminals may be one or more receiving terminals excluding the receiving terminal #1 that has transmitted ACK among a plurality of receiving terminals using the feedback resource region #1 within the PSFCH #1.

[Case C]

Information elements shown in Table 15 below may be configured by the above-described signaling scheme. A

TABLE 14

| | HARQ feedback scheme | PSFCH | Feedback resource region | Sequence pattern | Sequence | |
|---|---|---|---|---|---|---|
| Receiving terminal #1 | ACK/NACK feedback scheme | PSFCH #1 | Feedback resource region #1 | Sequence pattern #2 | ACK | Sequence #2 |
| | | | | | NACK | Sequence #1 |
| Receiving terminal #2 | ACK/NACK feedback scheme | PSFCH #1 | Feedback resource region #1 | Sequence pattern #2 | ACK | Sequence #3 |
| | | | | | NACK | Sequence #1 | plurality of PSFCHs (e.g., PSFCHs #1 and #2) may be configured, and each PSFCH may include a plurality of feedback resource regions (e.g., feedback resource regions #1 and #2).

TABLE 15

| | HARQ feedback scheme | PSFCH | Feedback resource region | Sequence pattern | | Sequence |
|---|---|---|---|---|---|---|
| Receiving terminal #1 | ACK/NACK feedback scheme | PSFCH #1 | Feedback resource regions #1 and #2 | Sequence pattern #3 | ACK | Sequence #1 |
| | | | | | NACK | Arbitrary sequence |
| Receiving terminal #2 | ACK/NACK feedback scheme | PSFCH #2 | Feedback resource regions #1 and #2 | Sequence pattern #3 | ACK | Sequence #2 |
| | | | | | NACK | Arbitrary sequence |

The receiving terminal #1 may successfully receive sidelink data from the transmitting terminal, and the receiving terminal #2 may fail to receive the sidelink data. In this case, the receiving terminal #1 may transmit the sequence #1 mapped to ACK to the transmitting terminal through the feedback resource region #1 within the PSFCH #1 (S904), and the receiving terminal #2 may transmit an arbitrary sequence mapped to NACK to the transmitting terminal through the feedback resource region #2 within the PSFCH #2 (S904).

The transmitting terminal knows the configuration of the information elements described in Table 15, and may perform a monitoring operation on the PSFCH #1 to receive the HARQ response of the receiving terminal #1, and may perform a monitoring operation on the PSFCH #2 to receive the HARQ response of the receiving terminal #2. The transmitting terminal may detect the sequence #1 in the feedback resource region #1 within the PSFCH #1, and may detect an arbitrary sequence in the feedback resource region #2 within the PSFCH #2.

Accordingly, the transmitting terminal may determine that decoding of the sidelink data is successful in the receiving terminal #1 among one or more receiving terminals using the PSFCH #1, and may determine that decoding of the sidelink data has failed in one or more receiving terminals (excluding the receiving terminal(s) that have transmitted ACK among a plurality of receiving terminals).

[Case D]

Information elements shown in Table 16 below may be configured by the above-described signaling scheme. When one or more PSFCHs are configured, a PSFCH #1 may be one PSFCH among the one or more PSFCHs. When the PSFCH #1 includes one or more feedback resource regions, a feedback resource region #1 may be one feedback resource region among the one or more feedback resource regions.

The receiving terminal #1 may successfully receive sidelink data from the transmitting terminal, and the receiving terminal #2 may fail to receive the sidelink data. In this case, the receiving terminal #1 may not transmit a HARQ response (e.g., ACK) to the transmitting terminal, and the receiving terminal #2 may transmit the sequence #2 mapped to NACK to the transmitting terminal through the feedback resource region #1 within the PSFCH #1 (S904).

The transmitting terminal knows the configuration of the information elements described in Table 16, and in order to receive the HARQ responses (e.g., NACK) of the receiving terminals #1 and #2, may perform a monitoring operation on the feedback resource region #1 within the PSFCH #1. The sequence #1 may be orthogonal to sequence #2, and even when the sequences #1 and #2 are transmitted through the same feedback resource region, the transmitting terminal may distinguish between the sequence #1 and the sequence #2 from among detected sequences.

The transmitting terminal may detect the sequence #2 in the feedback resource region #1 within the PSFCH #1. Accordingly, the transmitting terminal may determine that decoding of the sidelink data in the receiving terminal #2 has failed. When the sequence #1 is not detected in the feedback resource region #1 within the PSFCH #1, the transmitting terminal may determine that the decoding of the sidelink data is successful in the receiving terminal #1.

[Case E]

Information elements shown in Table 17 below may be configured by the above-described signaling scheme. When one or more PSFCHs are configured, a PSFCH #1 may be one PSFCH among the one or more PSFCHs. When the PSFCH #1 includes one or more feedback resource regions, the feedback resource region #1 may be one feedback resource region among the one or more feedback resource regions.

TABLE 16

| | HARQ feedback scheme | PSFCH | Feedback resource region | Sequence pattern | | Sequence |
|---|---|---|---|---|---|---|
| Receiving terminal #1 | NACK-only feedback scheme | PSFCH #1 | Feedback resource region #1 | Sequence pattern #4 | ACK | — |
| | | | | | NACK | Sequence #1 |
| Receiving terminal #2 | NACK-only feedback scheme | PSFCH #1 | Sequence resource region #1 | Feedback pattern #4 | ACK | — |
| | | | | | NACK | Sequence #2 |

TABLE 17

| | HARQ feedback scheme | PSFCH | Feedback resource region | Sequence pattern | Sequence | |
|---|---|---|---|---|---|---|
| Receiving terminal #1 | NACK-only feedback scheme | PSFCH #1 | Feedback resource region #1 | Sequence pattern #5 | ACK | — |
| | | | | | NACK | Sequence #1 |
| Receiving terminal #2 | NACK-only feedback scheme | PSFCH #1 | Feedback resource region #1 | Sequence pattern #5 | ACK | — |
| | | | | | NACK | Sequence #1 |

The receiving terminal #1 may successfully receive sidelink data from the transmitting terminal, and the receiving terminal #2 may fail to receive the sidelink data. In this case, the receiving terminal #1 may not transmit a HARQ response (e.g., ACK) to the transmitting terminal, and the receiving terminal #2 may transmit the sequence #1 mapped to NACK to the transmitting terminal through the feedback resource region #1 within the PSFCH #1 (S904).

The transmitting terminal knows the configuration of the information elements described in Table 17, and in order to receive the HARQ responses (e.g., NACK) of the receiving terminals #1 and #2, may perform a monitoring operation on the feedback resource region #1 within the PSFCH #1. The transmitting terminal may detect the sequence #1 in the feedback resource region #1 within the PSFCH #1. Accordingly, the transmitting terminal may determine that decoding of the sidelink data has failed in one or more terminals among a plurality of receiving terminals using the feedback resource region #1 within the PSFCH #1.

Meanwhile, when the HARQ response (e.g., ACK or NACK) of each receiving terminal can be identified, an MCS level may be changed in a retransmission procedure of the sidelink data. For example, when the number of all receiving terminals participating in sidelink-groupcast communication is k, and the number of receiving terminal(s) that have transmitted ACK (e.g., sequence mapped to ACK) in an initial transmission procedure of the sidelink data is i, the sidelink retransmission procedure for (k–i) receiving terminals may be performed. That is, the (k–i) receiving terminals may be receiving terminals that have transmitted NACK (e.g., sequence mapped to NACK) in the initial transmission procedure of the sidelink data. Here, each of k and i may be an integer of 1 or more, and k may be greater than i.

In the sidelink data retransmission procedure, the MCS level may be changed based on the worst channel state information (CSI) among CSI(s) of the (k–i) receiving terminals. Accordingly, the size of a PSSCH resource region used for retransmission of the sidelink data may be changed. The transmitting terminal may transmit SCI including scheduling information (e.g., resource allocation information) for retransmission sidelink data on a PSCCH and/or PSSCH. The scheduling information for the retransmission sidelink data may include information indicating the changed MCS level.

A PSFCH resource region (e.g., feedback resource region) for HARQ feedback for the retransmission sidelink data may be configured in consideration of the (k–i) receiving terminals excluding i receiving terminals that have transmitted ACK among k receiving terminals (i.e., all receiving terminals). In addition, a sequence for the (k–i) receiving terminals may be reconfigured.

When the number i of receiving terminals that have transmitted ACK (e.g., sequence mapped to ACK) for the initial transmission sidelink data is large, the size of the PSFCH resource region for HARQ feedback for the retransmission sidelink data may be configured to be smaller than the PSFCH resource region for HARQ feedback for the initial transmission sidelink data. Resources, sequences, and/or specific signals used respectively by the (k–i) receiving terminals may be newly configured.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a transmitting terminal in a communication system, the operation method comprising:
   receiving, from a base station, a higher layer signaling message including information indicating a sequence pattern which indicates a mapping relationship between hybrid automatic repeat request (HARQ) responses and sequences, and physical sidelink feedback channel (PSFCH) configuration information including information indicating a period of a PSFCH resource region and information indicating a set of physical resource blocks (PRBs) of the PSFCH resource region;
   transmitting, to a plurality of receiving terminals, sidelink control information (SCI) including resource allocation information of data and configuration information for HARQ feedback for the data;
   transmitting, to the plurality of receiving terminals, the data on a physical sidelink shared channel (PSSCH) indicated by the SCI; and
   performing a monitoring operation to receive, from the plurality of receiving terminals, the sequences mapped to the HARQ responses for the data based on the sequence pattern in the PSFCH resource region indicated by the PSFCH configuration information, wherein negative acknowledgements (NACKs) of the plurality of receiving terminals are mapped to different sequences, wherein acknowledgements (ACKs) of the plurality of receiving terminals are mapped to different sequences, and wherein the period of the PSFCH resource region in a resource pool is determined based on the period indicating by the PSFCH configuration information, and a frequency resource of the PSFCH resource region is determined based on the set of PRBs indicating by the PSFCH resource region.

2. The operation method according to claim 1, wherein the higher layer signaling message includes information indicating a HARQ feedback scheme, the HARQ feedback scheme is an acknowledgement (ACK)/NACK feedback scheme or a NACK-only feedback scheme, ACK or NACK is fed back when the ACK/NACK feedback scheme is used, and only NACK is fed back when the NACK-only feedback scheme is used.

3. The operation method according to claim 1, wherein the higher layer signaling message further includes information indicating a maximum number of sequences usable in the PSFCH resource region.

4. The operation method according to claim 1, wherein the configuration information for HARQ feedback includes at least one of information indicating a HARQ feedback scheme, information indicating a feedback resource region allocated to the plurality of receiving terminals within the PSFCH resource region, information indicating the sequences allocated to the plurality of receiving terminals, or combinations thereof.

5. The operation method according to claim 1, wherein the PSFCH resource region includes a plurality of feedback resource regions, and the plurality of feedback resource regions are allocated to different receiving terminals, respectively.

6. The operation method according to claim 1, wherein sequences mapped to ACKs of the plurality of receiving terminals do not exist.

7. An operation method of a first receiving terminal in a communication system, the operation method comprising:
receiving, from a base station, a higher layer signaling message including information indicating a sequence pattern which indicates a mapping relationship between hybrid automatic repeat request (HARQ) responses and sequences, and physical sidelink feedback channel (PSFCH) configuration information including information indicating a period of a PSFCH resource region and information indicating a set of physical resource blocks (PRBs) of the PSFCH resource region;
receiving, from a transmitting terminal, sidelink control information (SCI) including resource allocation information of data and configuration information for HARQ feedback for the data;
performing a monitoring operation on a physical sidelink shared channel (PSSCH) indicated by the SCI to receive the data from the transmitting terminal; and
transmitting, to the transmitting terminal, a first sequence mapped to a HARQ response for the data based on the sequence pattern through the PSFCH resource region indicated by the PSFCH configuration information,
wherein the first sequence is orthogonal to a second sequence transmitted from a second receiving terminal in the PSFCH resource region, wherein negative acknowledgements (NACKs) of a plurality of receiving terminals including the first receiving terminal and the second receiving terminal are mapped to different sequences, wherein acknowledgements (ACKs) of the plurality of receiving terminals are mapped to different sequences, and wherein the period of the PSFCH resource region in a resource pool is determined based on the period indicating by the PSFCH configuration information, and a frequency resource of the PSFCH resource region is determined based on the set of PRBs indicating by the PSFCH resource region.

8. The operation method according to claim 7, wherein the higher layer signaling message includes information indicating a HARQ feedback scheme, the HARQ feedback scheme is an acknowledgement (ACK)/NACK feedback scheme or a NACK-only feedback scheme, ACK or NACK is transmitted when the ACK/NACK feedback scheme is used, and only NACK is transmitted when the NACK-only feedback scheme is used.

9. The operation method according to claim 7, wherein the higher layer signaling message further includes information indicating a maximum number of sequences usable in the PSFCH resource region.

10. The operation method according to claim 7, wherein the configuration information for HARQ feedback includes at least one of information indicating a HARQ feedback scheme, information indicating a feedback resource region allocated to the first receiving terminal within the PSFCH resource region, information indicating the first sequence allocated to the first receiving terminal, or combinations thereof.

11. The operation method according to claim 7, wherein the sequences mapped to the ACKs are orthogonal to the sequences mapped to the NACKs.

12. The operation method according to claim 7, wherein sequences mapped to ACKs of the plurality of receiving terminals do not exist.

13. An operation method of a base station in a communication system, the operation method comprising:
configuring a physical sidelink feedback channel (PSFCH) resource region used for transmission and reception of hybrid automatic repeat request (HARQ) responses for data;
configuring a sequence pattern indicating a mapping relationship between the HARQ responses and sequences; and
transmitting a higher layer signaling message including configuration information of the PSFCH resource region and configuration information of the sequence pattern,
wherein the sequences mapped to the HARQ responses are transmitted according to the sequence pattern in the PSFCH resource region,
wherein negative acknowledgements (NACKs) of a plurality of receiving terminals are mapped to different sequences,
wherein the sequence pattern indicates that acknowledgements (ACKs) of the plurality of receiving terminals are mapped to different sequences, and
wherein the configuration information of the PSFCH resource region includes information indicating a period of the PSFCH resource region and information indicating a set of physical resource blocks (PRBs) of the PSFCH resource region.

14. The operation method according to claim 13, wherein the higher layer signaling message includes information indicating a HARQ feedback scheme, the HARQ feedback scheme is an acknowledgement (ACK)/NACK feedback scheme or a NACK-only feedback scheme, ACK or NACK is transmitted when the ACK/NACK feedback scheme is used, and only NACK is transmitted when the NACK-only feedback scheme is used.

15. The operation method according to claim 13, wherein the PSFCH resource region includes a plurality of feedback resource regions, and the plurality of feedback resource regions are used for different terminals, respectively.

16. The operation method according to claim 13, wherein the sequences mapped to the ACKs are orthogonal to the sequences mapped to the NACKs.

* * * * *